Sept. 22, 1953  WOLF-WITO VON WITTERN  2,653,302
ACCELEROMETER PICKUP OF VERY SMALL SIZE AND WEIGHT
Filed Oct. 10, 1950
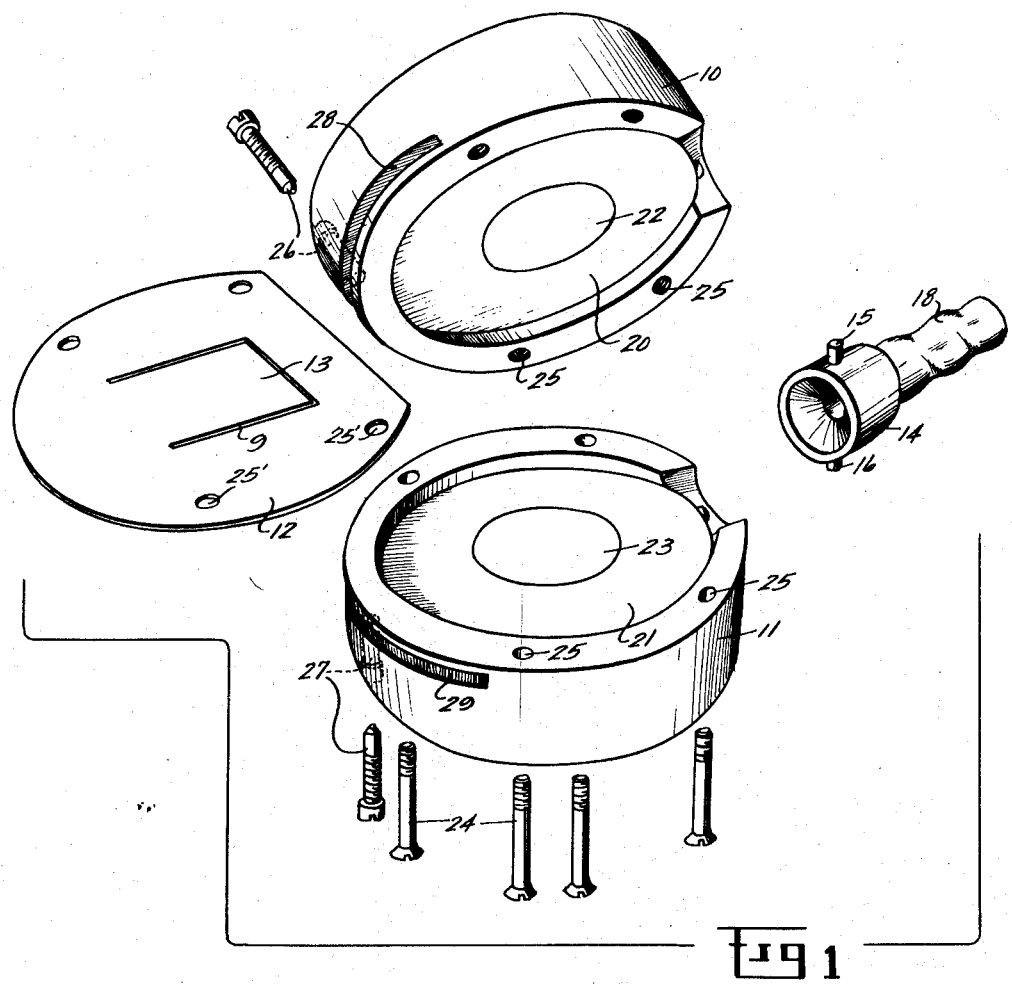
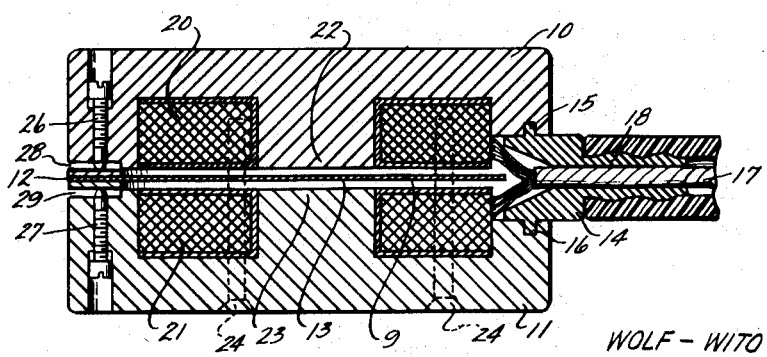
INVENTOR.
WOLF-WITO VON WITTERN

UNITED STATES PATENT OFFICE 2,653,302

ACCELEROMETER PICKUP OF VERY SMALL SIZE AND WEIGHT

Wolf-Wito von Wittern, Dayton, Ohio

Application October 10, 1950, Serial No. 189,461

1 Claim. (Cl. 336—134)

(Granted under Title 35, U. S. Code (1952), sec. 266)

The invention described herein may be manufactured and used by or for the United States Government for governmental purposes without payment to me of any royalty thereon.

This invention relates to accelerometers and more particularly to an improved accelerometer of the variable reluctance type.

The objects of the present invention comprise the provision of an accelerometer pickup of extremely small mass and dependable quality suitable for physiological use by ingestion in the making of acceleration measurements under circumstances of low mechanical impedances such as within animal bodies and the like.

An operative embodiment of the present invention is shown in the accompanying drawings wherein:

Fig. 1 is a perspective exploded view of an accelerometer that embodies the present invention; and Fig. 2 is a section taken axially of the accelerometer shown in Fig. 1 assembled.

The accelerometer shown in Figs. 1 and 2 of the drawings comprises a pair of electrically conducting mating housing disks 10 and 11, a ferromagnetic membrane 12 with cantilever mounted tongue 13 for being secured between the disks 10 and 11, and a connecting plug 14 that is secured in a suitable socket in the disks 10 and 11 by pins 15 and 16 or the like and that houses an electrically conducting cable 17. The cable 17 is shown housed in a flexible sheath 18.

Each disk 10 and 11 has an annular slot in its mating face for housing a coil 20 or 21 positioned outwardly of mating poles 22 and 23, respectively throughout. The coils 20 and 21 are energized from the cable 17 as indicated in Fig. 2. Each of the coils 20 and 21 has two transformer coupled windings as indicated in Fig. 2 by four lead wires from the cable 17 to each of the coils. Registration and clamping action between the disks 10 and 11 is maintained by screws 24 in screw holes 25, that are indicated in the membrane 12 by the numeral 25'.

The contact faces or matching rims of the disks 10 and 11 in assembled position with the membrane 12 clamped therebetween preferably are substantially parallel. Provision is made for the mechanical adjustment of the membrane 12 and then for securing the membrane in its adjusted position.

In the structure shown, membrane clamping screws 26 and 27 thread in apertures remote from the socket for the connecting plug 14 to clamp the membrane 12 in its adjusted position therebetween. Since an extremely thin membrane may be twisted or torn by the action of the tips of the membrane clamping screws 26 and 27 directly engaging the membrane, slots 28 and 29 in the disks 10 and 11, respectively, remote from the socket for the connecting plug 14, impart resilience to the slot overlying contact face portions or undercut rims of the disks. The membrane clamping screws 26 and 27 thread through the outer walls of the disks and bear against the inner wall of the slots 28 and 29, respectively, to clamp the membrane 12 in adjusted position between the pair of the disks.

It will be apparent that one membrane clamping screw and slot instead of two and, for a sufficiently strong membrane 12 the omission of the slot overlying contact face portions of the disks 10 and 11 are within the scope of the present invention. With the pair of disks 10 and 11 screwed together with the membrane 12 clamped in its adjusted position therebetween, the present accelerometer is adapted for service.

The accelerometer may be sufficiently small so that it may be positioned within an animal body by swallowing or the like. The disks 10 and 11 preferably are of silicon iron. A model that has been used satisfactorily for this type of experimental use weighed four grams, was of cylindrical shape and was 12 millimeters in diameter and 7 millimeters long.

The cable 17 supplies preferably radio frequencies to the coils 20 and 21 in the accelerometer. The proximity of the coils 20 and 21 imparts a transformer type of field therebetween. The membrane tongue 13 is in an open space between the poles 22 and 23 and hence is within and effects the field between the coils 20 and 21. Acceleration of the accelerometer causes displacement of the membrane tongue 13 and influences correspondingly the output voltage of the cable 17.

An acceleration component acting perpendicular to the plane of the membrane 12 causes a deflection of the membrane tongue 13. This deflection is constant for the frequency components sufficiently below the natural frequency of the tongue. The magnitude of the deflection of the membrane tongue 13 decreases with increasing natural frequency. The natural frequency of the membrane tongue 13 changes with changes in the thickness and shape of the tongue. The accelerometer may be matched by these changes through a wide range of acceleration and frequencies.

An entrapped air space surrounds the membrane tongue 13 and consequently when acceleration imparts motion to the membrane tongue 13 the air around it is compressed and decompressed and is forced to flow through the very narrow slot 9 surrounding three sides of the membrane tongue. The friction of the air flow in the slot 9 causes a damping of the motion of the tongue. The effective damping so accomplished depends upon the mass and the elasticity per unit area of the membrane tongue 13; on the area of the tongue; on the volume of the air space around the tongue and on the width of the slot 9.

The position of the tongue 13, that is attached at one end of the membrane 12, is measured by the measurement of the reluctance of the magnetic circuits formed by the disks 10 and 11 and the tongue. Reluctance is opposition to magnetic flux, or it is resistance in a magnetic circuit. The moving armature form of the reluctance type pick-up employs an iron armature, represented here by the membrane tongue 13, so mounted that its motion changes the reluctance between the tongue 13 and the poles 23 and 22. The resultant change in flux through the coils 20 and 21 induce a voltage proportional to the rate of change of flux or to the acceleration of motion to which the accelerometer is subjected. When the armature or membrane tongue is midway between the pole pieces 22 and 23, there is a minimum magnetic flux through it since the fields of the two coils 20 and 21 counteract there. As the armature or membrane tongue 13 moves, one field will predominate as the reluctance of one circuit is decreased and the other one is increased with the result that the output voltage across the coils 20 and 21 varies in phase and in magnitude with the position of the armature or membrane tongue 13. In this way the mechanical motion of the membrane tongue 13 is faithfully represented by the voltage induced in the coils and the device measures vibratory stresses without being disturbed by the slow-acting strains due to temperature changes. Temperature effects are minimized by causing both circuits to act as transformer cores since each of the coils carries two windings.

A deflection of the membrane tongue 13 decreases the coupling of one transformer and increases the coupling of the other. The primary windings of the two transformers are connected in line with the same turn. The secondary windings of the two transformers are connected in line with opposite turns. When a radio frequency voltage is applied to the primary windings, the output voltage across the secondary windings will be a minimum when the coupling of the two transformers is equal. This occurs when the tongue 13 is in the middle position between the poles and may be used as a control for the adjustment of the tongue.

The described acceleration pickup may be used in usual radio frequency devices up to a frequency of about 20 kilocycles. Any unbalanced output voltage must be compensated for by an additional compensation circuit (not shown). Because of the generation of harmonics of the radio frequency used in the pickup, a tuned amplifier or a filter network preferably is used at the amplifier input. Coupling effects preferably are diminished by twisting together the leads of each coil and all pairs of leads within the cable 17.

The particular structure and manner of assembly and the configuration of the device that is shown and described herein has been submitted for the purpose of illustrating and explaining an operative embodiment of the present invention and limited changes and modifications may be made therein without departing from the scope of the present invention.

What I claim is:

A variable reluctance type accelerometer, comprising a pair of disks, means for securing said disks together, a pair of coils positioned within an annular groove in the mating face of each of said disks and outwardly of and having inner surfaces substantially flush with the inner unattached end of the associated pole thereof, mating areas of said disks undercut to impart limited flexibility thereto, screw means threading axially in apertures in said disks such that the screw heads are accessible for adjustment from outwardly of said disks and the tips of the screw means remote from the heads bear against to force together the undercut mating areas of said disks, and a membrane clamped between the mating faces of said disks and having a cantilever supported tongue positioned for movement with one degree of freedom between the poles of said disks in response to mechanical acceleration.

WOLF-WITO von WITTERN.

References Cited in the file of this patent

UNITED STATES PATENTS

| Number | Name | Date |
|---|---|---|
| 2,440,605 | Hathaway | Apr. 27, 1948 |
| 2,509,210 | Clark | May 30, 1950 |